(12) United States Patent
Miller et al.

(10) Patent No.: US 11,702,810 B2
(45) Date of Patent: Jul. 18, 2023

(54) BARRIER FOR HAZARDOUS LIQUIDS

(71) Applicant: The United States of America, as represented by the Secretary of the Navy, Crane, IN (US)

(72) Inventors: Colt T. Miller, Bloomington, IN (US); Sean P Gish, Bedford, IN (US)

(73) Assignee: The United States of America, as Represented by the Secretary of the Navy, Washington, DC (US)

(*) Notice: Subject to any disclaimer, the term of this patent is extended or adjusted under 35 U.S.C. 154(b) by 0 days.

(21) Appl. No.: 17/578,657

(22) Filed: Jan. 19, 2022

(65) Prior Publication Data
US 2022/0325489 A1 Oct. 13, 2022

Related U.S. Application Data

(60) Provisional application No. 63/140,273, filed on Jan. 22, 2021.

(51) Int. Cl.
*E02B 3/10* (2006.01)

(52) U.S. Cl.
CPC .................. *E02B 3/106* (2013.01)

(58) Field of Classification Search
CPC ... E02B 3/106; E02B 3/04; E02B 7/02; E02B 7/20
See application file for complete search history.

(56) References Cited

U.S. PATENT DOCUMENTS

| | | | | |
|---|---|---|---|---|
| 5,040,919 A * | 8/1991 | Hendrix | ................ | E02B 3/108 405/91 |
| 5,762,233 A * | 6/1998 | Van Romer | ............... | B64F 5/30 220/9.1 |
| 6,551,025 B2 * | 4/2003 | Dery | ....................... | E02B 3/108 405/25 |
| 6,880,720 B2 * | 4/2005 | Van Romer | ........... | F16N 31/006 220/573 |
| 7,114,879 B2 * | 10/2006 | Obermeyer | ............. | E05F 15/53 405/91 |
| 9,498,806 B2 * | 11/2016 | Stroup | ................... | B08B 17/025 |
| 10,323,401 B2 * | 6/2019 | Wilkie | ................... | B01D 35/02 |
| 10,458,084 B2 * | 10/2019 | Nero | ..................... | F16M 11/22 |
| 10,753,057 B1 * | 8/2020 | Sokolowski | ............ | E02B 3/108 |
| 10,900,185 B1 * | 1/2021 | Huston | ................ | E04H 4/0056 |

(Continued)

OTHER PUBLICATIONS

"Water Gate", Mar. 2017, Victoriaville, QC, Canada, G6P 4L8.

*Primary Examiner* — Benjamin F Fiorello
(74) *Attorney, Agent, or Firm* — Naval Surface Warfare Center, Crane Division

(57) ABSTRACT

Provided is a flood barrier for use with HAZMAT materials. The barrier includes a first wall and a second wall joined together at a first end, tape for securing the barrier to a surface to prevent leaks, multiple flexible ribs attached between the first wall and second walls, one or more holes for filling, and a rod that separates an open end of the first and second wall to form a chamber with an open end. Several insulating floats are evenly spaced between the ribs on a bottom surface of the first wall to prevent overflow. A gap filler, such as uncured silicone and tape is used in the transition from a terminal rib to an exposed corner of the barrier. The barrier can withstand high heat for a sustained period of time, is leak-proof, and includes an improved method of sealing corners.

20 Claims, 4 Drawing Sheets

(56) References Cited

U.S. PATENT DOCUMENTS

| | | | |
|---|---|---|---|
| 2010/0003081 A1* | 1/2010 | Doolaege | E02B 3/108 405/115 |
| 2013/0108371 A1* | 5/2013 | Marshall | B65D 90/24 405/114 |
| 2016/0083918 A1* | 3/2016 | Cadogan | E06B 9/0692 405/115 |
| 2017/0057832 A1* | 3/2017 | Wilkie | E02B 3/04 |
| 2017/0167096 A1* | 6/2017 | Obermeyer | F16G 1/06 |

* cited by examiner

BARRIER FOR HAZARDOUS LIQUIDS

CROSS-REFERENCE TO RELATED APPLICATIONS

The present application claims priority to U.S. Provisional Patent Application Ser. No. 63/140,273, filed Jan. 22, 2021, entitled "Barrier for Hazardous Liquids," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200589US02) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The invention relates generally to a flood barrier. More specifically, it relates to a flood barrier that is rated for use with HAZMAT materials and that seals to a metal and/or concrete surface.

BACKGROUND

A flood barrier is designed to contain and divert water from flooding the area behind the barrier. Flood Barriers are water-activated and are often available in predefined lengths. Flood Barriers are designed to be stored away until needed. As flood water makes contact with the barrier, it is contained and prevented from flowing into an unwanted area.

While flood barriers are useful for preventing water from flooding a protected area, the existing flood barriers known and disclosed in the art not rated for use with HAZMAT materials, are not designed to dissipate heat, and do not seal to a surface. An unfilled need that exists in the art is for a HAZMAT barrier that can be used to contain chemical leaks or spills that is then thrown away. Additionally there is a need for a barrier that can withstand high heat for a sustained period of time, is leak-proof, and includes an improved method of sealing corners. Traditional flood barriers are folded in the corners to fit within a desired space. These prior art barriers do not effectively maintain a barrier in a corner even in situations where the exact length and dimensions of the space where it will be used are not known prior to deploying the barrier. As can be clearly seen from the above, there is a need for a new and improved flood barrier that can be used with HAZMAT materials.

SUMMARY OF THE INVENTION

The present invention relates to a flood barrier that is rated for use with HAZMAT materials that seals to a metal and/or a concrete surface. The barrier includes a first wall and a second wall joined together at a first end, a tape on a leading edge for securing the barrier to a surface to prevent leaks, multiple flexible ribs attached between the first wall and second walls, one or more apertures and a rod that separates an open end of the first and second wall to a predefined angle to form a chamber with an open end. Several insulating floats are evenly spaced between the ribs on a bottom surface of the first wall to prevent overflow. A gap filler, such as uncured silicone and tape is used in the transition from a terminal rib to an exposed corner of the barrier. The barrier can withstand high heat for a sustained period of time, is leak-proof, and includes an improved method of sealing corners.

According to an illustrative embodiment of the present disclosure, it is an object of the present invention to provide a new and improved flood barrier that has all of the advantages of the prior art and none of the disadvantages.

According to a further illustrative embodiment of the present disclosure, it is an object of the present invention to provide a new and improved flood barrier that is rated for use with HAZMAT materials.

According to a further illustrative embodiment of the present disclosure, it is an object of the present invention to provide a new and improved flood barrier that seals to a metal, concrete, or other solid surface.

According to a further illustrative embodiment of the present disclosure, it is an object of the present invention to provide a new and improved flood barrier that is leak proof and prevents a liquid from flooding a protected area.

According to a further illustrative embodiment of the present disclosure, it is an object of the present invention to provide a new and improved flood barrier that utilizes an uncured silicon for sealing the barrier at the corners.

According to a further illustrative embodiment of the present disclosure, it is an object of the present invention to provide a new and improved flood barrier that can withstand high heat for a sustained period of time.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Generally, provided is a self-closing flood barrier for protecting an area against flooding. The barrier comprises a first wall and a second wall joined together at a first end; a sealing means on a leading edge of the second wall for securing the second wall to a surface to create a leak-proof barrier; a plurality of flexible ribs attached between the first wall and second walls, one or more apertures, and a rod that separates an open end of the first and second walls to a predefined angle to form a chamber with an open end. The barrier further includes a plurality of insulating floats evenly spaced between the ribs on a bottom surface of the first wall, a terminal rib on either end of the barrier, and a gap filler transitioning from said terminal rib to an exposed corner of the barrier.

Figure 1:
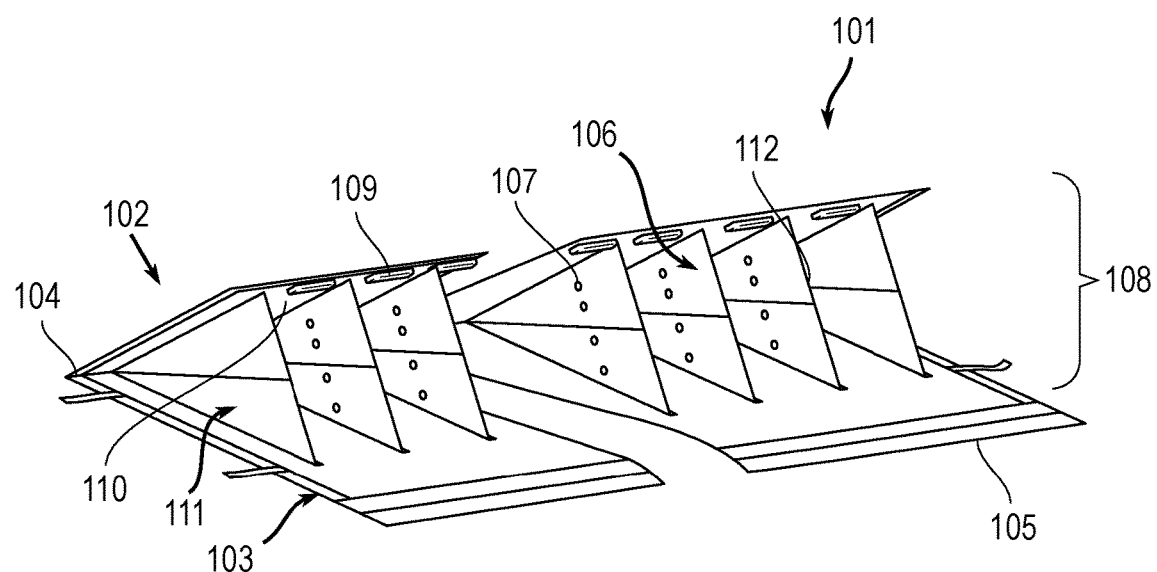
FIG. 1 shows a perspective view of the liquid facing side of the self-closing flood barrier.

FIG. 1 shows a perspective view of the liquid facing side of the self-closing flood barrier 101. The device comprises a first wall 102 and a second wall 103 joined together at a first end 104; a sealing means 105 on a leading edge of the second wall 103 for securing the second wall 103 to a surface (not shown) to create a leak-proof barrier. A plurality of flexible ribs 106 are attached between the first wall 102 and second wall 103. The flexible ribs 106 additionally include one or more apertures 107 and a rod 112 that separates an open end 108 of the first and second wall 102, 103 to a predefined angle to form a chamber with an open end 108. A plurality of insulating floats 109 are evenly spaced between the flexible ribs 106 on a bottom surface 110 of the first wall 102. A terminal rib 111 is disposed on either end of the barrier 101.

Figure 2:
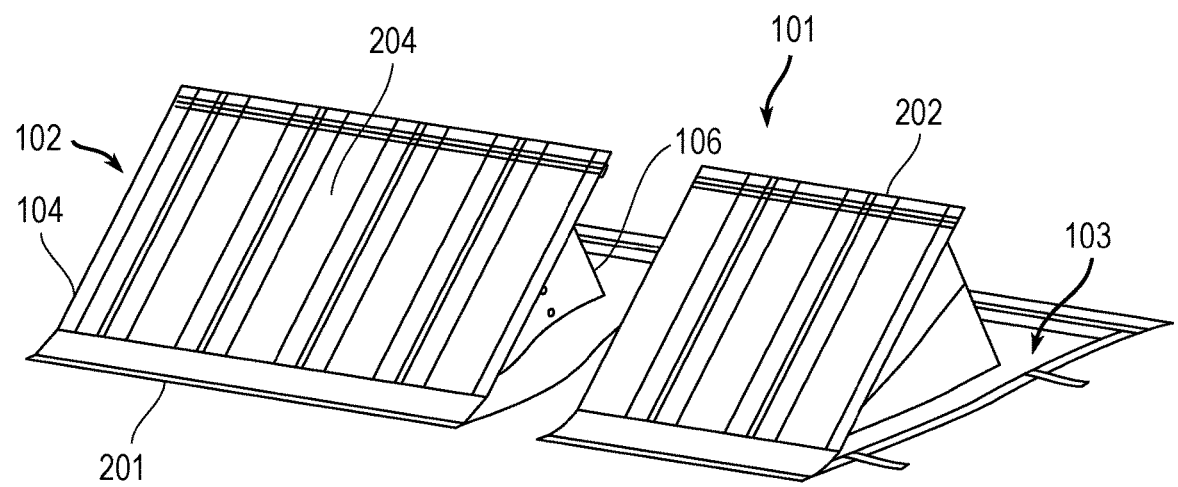
FIG. 2 shows a perspective view of the area protecting side of the self-closing flood barrier.

FIG. 2 shows a perspective view of the area protecting side of the self-closing flood barrier 101. The first and second walls 102, 103 are joined together at a first end 104. In an illustrative embodiment, the first and second walls 102, 103 are joined together and secured via a 12 inch wide sealing tape 201 folded equally over both walls. Also shown are the flexible ribs 106 where they attach to the first wall 102. In an embodiment, a six inch wide sealing tape 202 is secured over stitching that secures the flexible ribs 106 in place. As can be appreciated, stitching is often a weak point in a fabric that is intended to be waterproof. As such, a reinforcement, such as a sealing tape is desirable to prevent leaks.

In one illustrative embodiment, the first and second walls 102, 103 and the ribs 106, 111 are constructed of a material that provides chemical resistance, abrasion resistance, and high temperature resistance. In one illustrative embodiment the first and second walls 102, 103 and the ribs 106, 111 are constructed of a high strength fiberglass fabric coated with a specially formulated PTFE resin. In one illustrative embodiment the high strength fiberglass fabric coated with a specially formulated PTFE resin is ARMATEX TF 18 602.

In one illustrative embodiment, the outer side 204 of the first and second walls 102, 103 additionally comprise a textile fabric comprising high purity, high strength amorphous silica fibers woven into a strong, flexible fabric with an aluminum foil laminated on one side of the specially formulated PTFE resin using a high temperature adhesive. In one illustrative embodiment, the textile fabric comprising high purity, high strength amorphous silica fibers woven into a strong, flexible fabric with an aluminum foil is SILTEX 21-AL.

In one illustrative embodiment, the insulating floats are constructed of a cellular glass insulation comprising foamglas and a lightweight, rigid insulating material of sealed glass cells with constant insulating efficiency. In one illustrative embodiment, the cellular glass insulation is a FOAM-GLAS Block.

In one illustrative embodiment, the sealing tape is a 3M 8069 sealing tape with a temperature range of 0 degrees F. to +120 degrees F.

Figure 3:
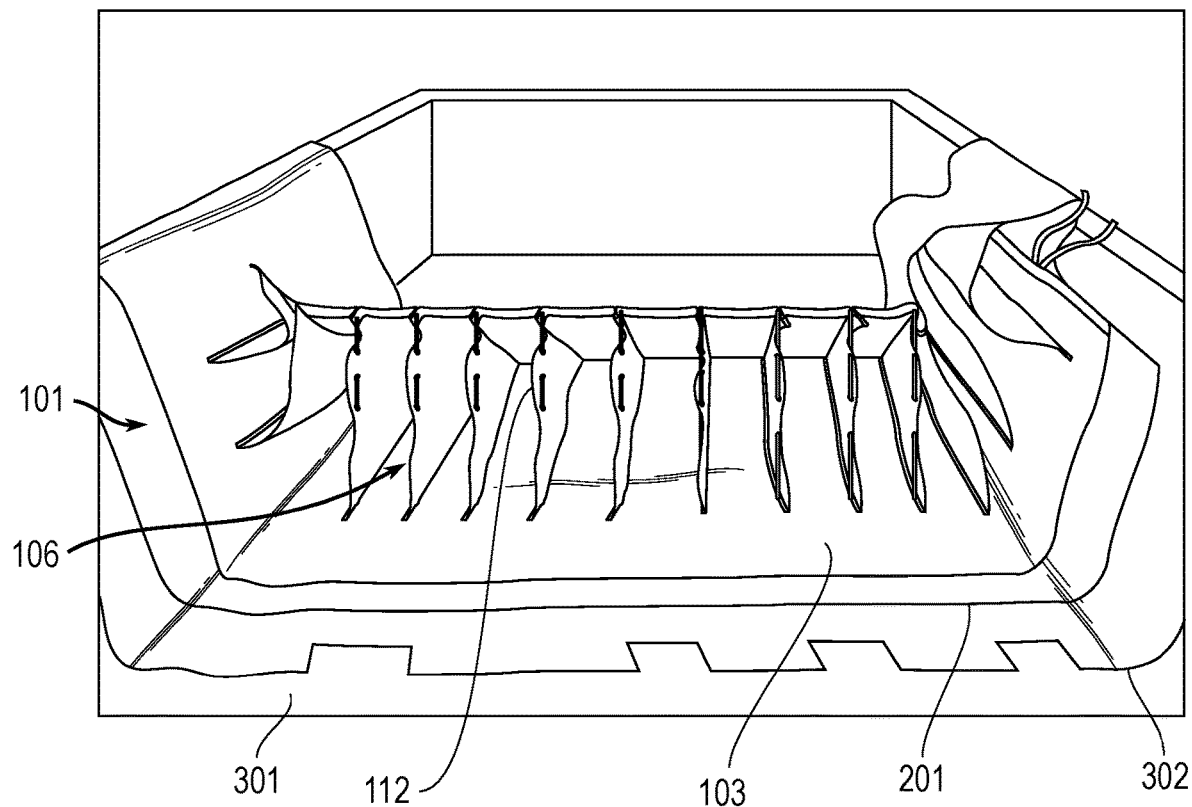
FIG. 3 shows a view of the barrier attached to a surface.

FIG. 3 shows a view of the barrier 101 attached to a surface 301. The rods 112 holding the barrier 101 open are clearly shown. In one illustrative embodiment, the barrier 101 includes a sealing means for securing the second wall 103 to a surface to create a leak-proof barrier. In one illustrative embodiment, the barrier 101 includes a gap filler 302 transitioning from the rib 106 to an exposed corner of the barrier 101. In one illustrative embodiment, the gap filler 302 comprises uncured silicone that enables the second wall 103 to transition from the tape on the barrier 101 to an exposed corner. An additional piece of tape overlaps the silicone and sealing tape 201. This method yielded the sealing needed to eliminate leaks for a duration of three hours before starting to weep. In one illustrative embodiment, the gap filler 302 comprises a combination of a first layer of sealing tape, a layer of uncured silicone and a second layer of sealing tape adhered to the barrier 101.

Figure 4A:
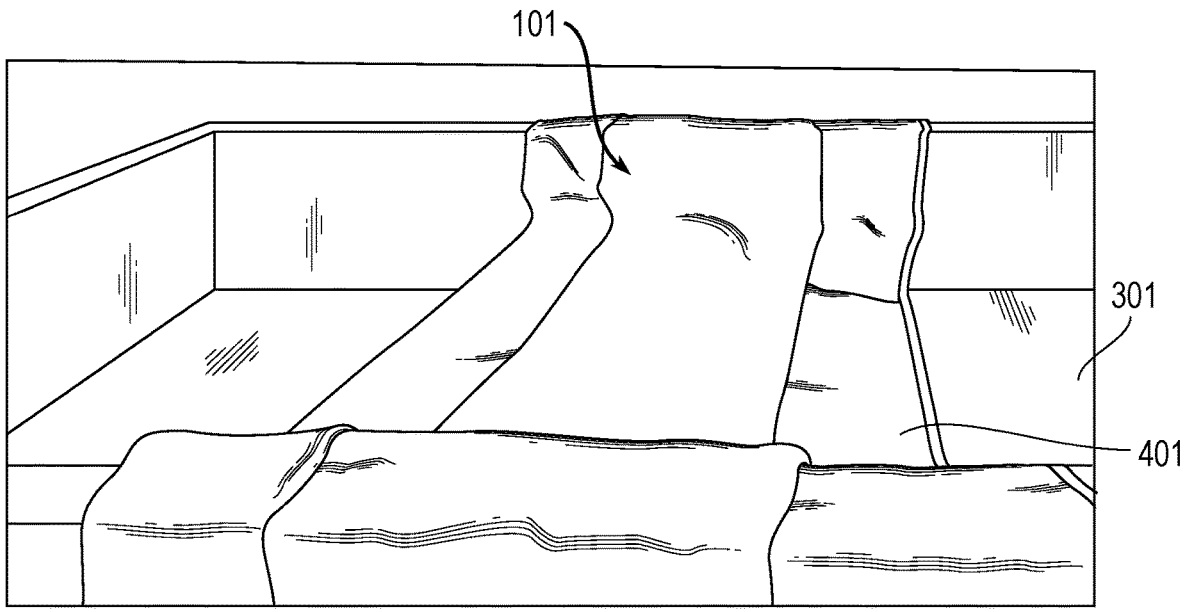
FIG. 4A shows a view of the barrier installed on top of a corrosive blanket.
Figure 4B:
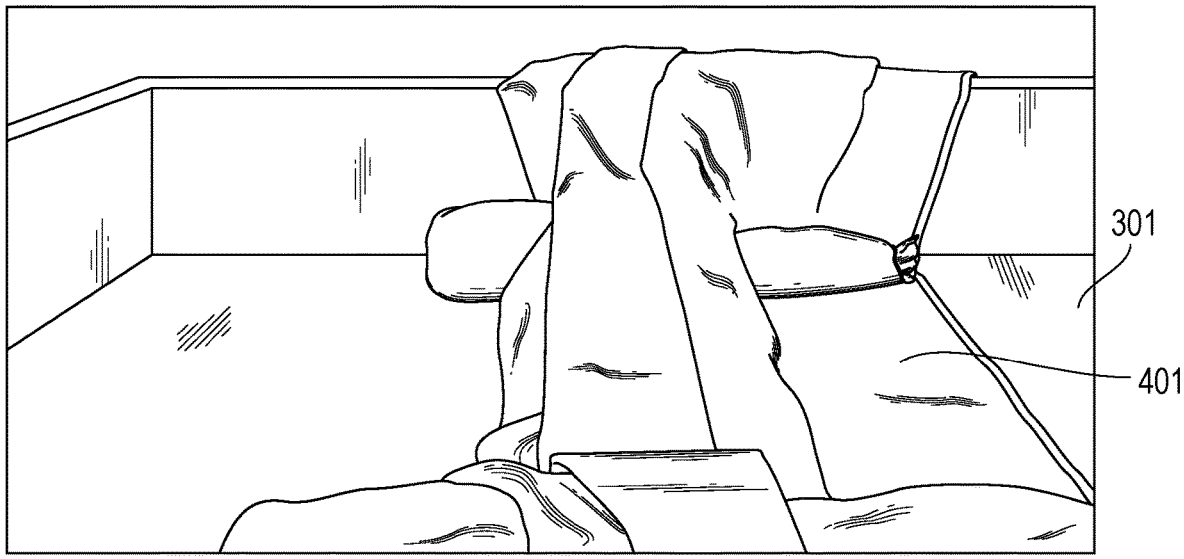
FIG. 4B shows a view of the barrier installed on top of a corrosive blanket.

FIGS. 4A-B show the barrier 101 installed on top of a corrosive blanket 401. An additional seamless layer of material can be used to surround the barrier 101 to catch small leaks from seam weeping. In one illustrative embodiment, a corrosive blanket 401 can be used with the barrier 101 and installed between a surface 301 and the barrier 101. The blanket 401 can be installed with sealing tape and uncured silicone in the same manner as the barrier 101. The blanket 401 can be constructed of a textile fabric comprising high purity, high strength amorphous silica fibers woven into a strong, flexible fabric with an aluminum foil, such as SILTEX 21-AL.

Example

Figure 5A:
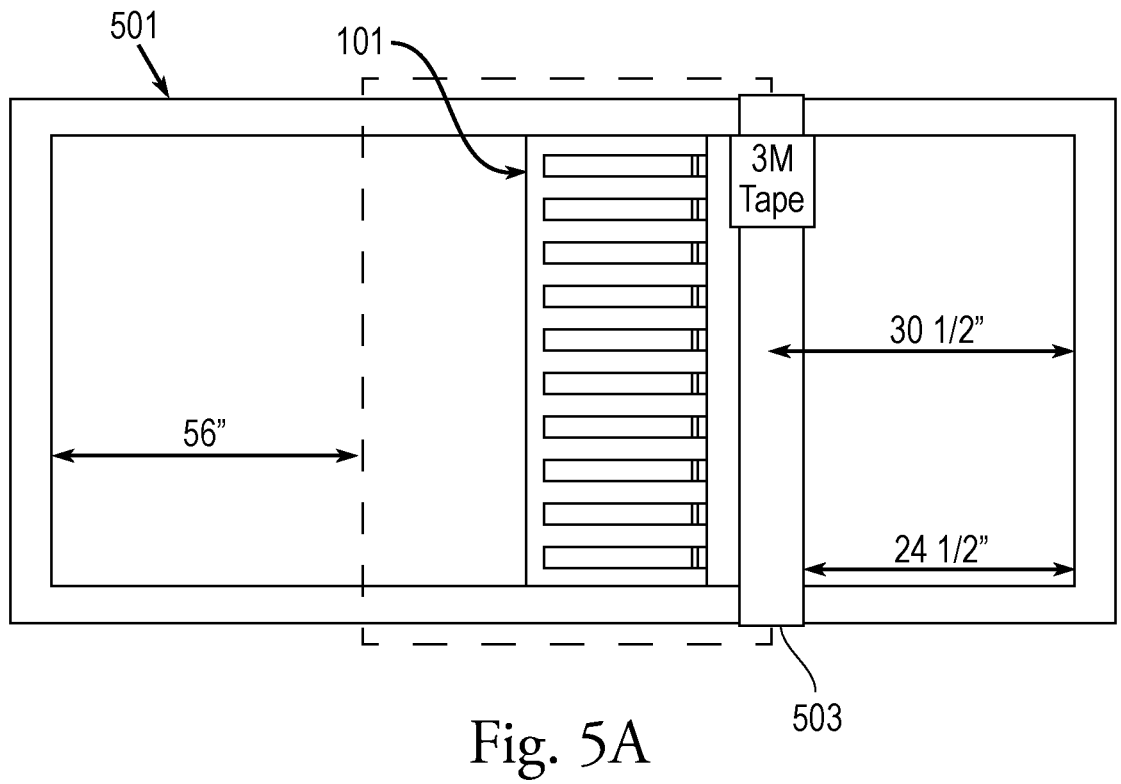
FIG. 5A shows an overhead view of the test setup.
Figure 5B:
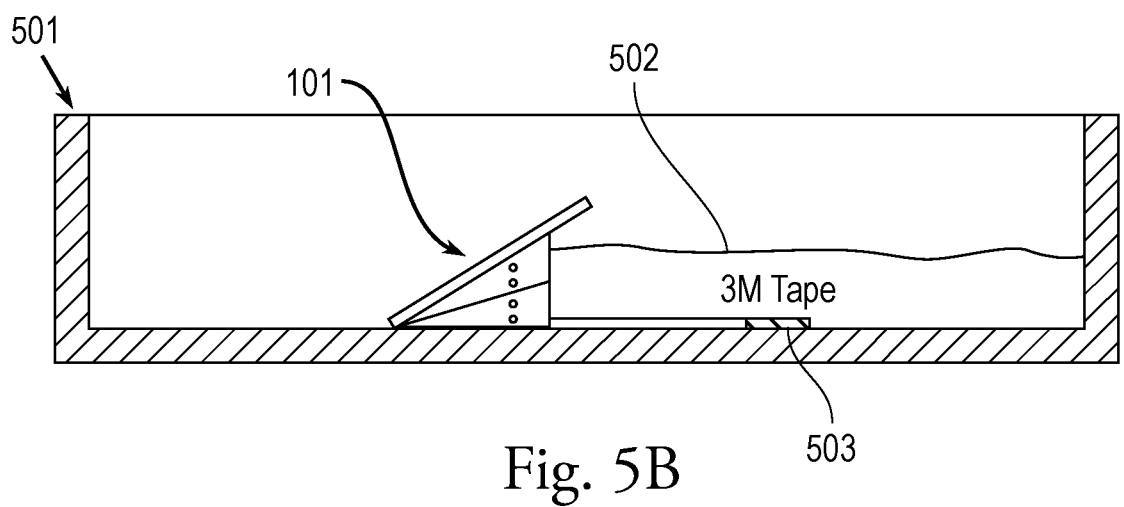
FIG. 5B shows a side view of the test setup.

Several tests were performed to determine the most desirable configuration for the barrier, particularly in corner areas where there is a transition from a horizontal to a vertical structure. The basic setup for the tests is illustrated in FIG. 5A, which shows an overhead view of the test setup, and FIG. 5B, which shows a side view of the test setup. Tests were performed using the barrier 101 in a concrete tub 501. The barrier 101 was tested laying on the floor alone, and using sand, sandbags, and traffic cones. The barrier 101 was filled with a liquid 502 in each test with the goal being that the device would not leak for at least 70 minutes. Leaks were identified in all embodiments. An additional embodiment including rods installed in the ribs, 3M (sealing) tape 503 and uncured silicone in the corners was tested and shown to withstand leaking. Additional tests with the same setup were performed with flammable liquids, including Triethyl Phosphate (TEP). The TEP was ignited and the barrier was observed during and after ignition. The barrier demonstrated its effectiveness at holding back chemicals in a high temperature environment allowing zero leakage during the first trial and minimal leakage during the second due to falling debris that punctured the barrier.

An additional test utilizing diesel fuel was performed. Diesel was pumped into the concrete tub 501 until the barrier 101 containment volume reached ten inches. Twenty five minutes after the initial pumping, the diesel was ignited where flames overtook the entire the concrete tub 501 housing the diesel and the barrier 101. At 40 minutes from initial ignition the barrier 101 was observed holding back the diesel. The diesel burned for 56 minutes prior to self-extinguishing. The barrier 101 functioned as designed by containing the diesel for the duration of the burn.

Although the invention has been described in detail with reference to certain preferred embodiments, variations and modifications exist within the spirit and scope of the invention as described and defined in the following claims.

The invention claimed is:

1. A flood barrier that attaches to a surface for protecting an area against flooding, comprising:
   a first wall and a second wall joined together at a first end;
   a sealing means on a leading edge of said second wall for securing said second wall to a surface to create a leak-proof barrier;
   a plurality of flexible ribs attached between said first wall and said second wall and further comprising one or more apertures and a rod that separates an open end of said first and second wall to a predefined angle to form a chamber with an open end;
   a plurality of insulating floats evenly spaced between said ribs on a bottom surface of said first wall;
   a terminal rib on either end of said barrier; and
   a gap filler transitioning from said terminal rib to an exposed corner of said barrier.

2. The device of claim 1, wherein said first and second wall and said ribs are constructed of a material that provides chemical resistance, abrasion resistance, and temperature resistance.

3. The device of claim 2, wherein said first and second wall and said ribs are constructed of a fiberglass fabric coated with a PTFE resin.

4. The device of claim 3, wherein an outer side of said first and second walls further comprise a textile fabric comprising amorphous silica fibers woven into a flexible fabric with an aluminum foil laminated on one side of said PTFE resin using an adhesive.

5. The device of claim 2, wherein said outer side of said first wall further comprises a sealing tape over said ribs.

6. The device of claim 1, wherein said insulating floats are constructed of a cellular glass insulation comprising foamglas and rigid insulating material of sealed glass cells with constant insulating efficiency.

7. The device of claim 1, wherein said first and second wall are joined together with sealing tape.

8. The device of claim 1, wherein said one or more apertures permit said liquid to be evenly distributed within said chamber.

9. The device of claim 1, wherein said open end of said first and second wall form a 27 degree angle.

10. The device of claim 1, wherein said barrier further comprises a seamless layer of material surrounding the barrier to minimize catch small leaks from seam weeping.

11. The device of claim 1, wherein said the gap filler comprises a combination of a first layer of sealing tape, a layer of uncured silicone and a second layer of sealing tape adhered to the barrier.

12. A flood barrier that attaches to a surface for protecting an area against flooding, comprising:
   a first wall and a second wall joined together at a first end, wherein said first and second walls and said ribs are constructed of a material that provides chemical resistance, abrasion resistance, and temperature resistance;
   wherein an outer side of said first and second walls further comprise a textile fabric comprising amorphous silica fibers woven into a flexible fabric with an aluminum foil laminated on one side of a PTFE resin using an adhesive;
   a sealing means on a leading edge of said second wall for securing said second wall to a surface to create a leak-proof barrier;
   a plurality of flexible ribs attached between said first wall and said second wall and further comprising one or more apertures and a rod that separates and open end of said first and second wall to a predefined angle to form a chamber with an open end;
   a plurality of insulating floats evenly spaced between said ribs on a bottom surface of said first wall, wherein said insulating floats are constructed of a cellular glass insulation comprising foamglas and rigid insulating material of sealed glass cells with constant insulating efficiency;
   a terminal rib on either end of said barrier;
   a gap filler transitioning from said terminal rib to an exposed corner of said barrier, wherein said the gap filler comprises a combination of a first layer of sealing tape, a layer of uncured silicone and a second layer of sealing tape adhered to the barrier; and
   a corrosive blanket installed between said surface and said barrier.

13. The device of claim 12, wherein said first and second wall and said ribs are constructed of a fiberglass fabric coated with a PTFE resin.

14. The device of claim 12, wherein said outer side of said first wall further comprises a sealing tape over said ribs.

15. The device of claim 12, wherein said one or more apertures permit said liquid to be evenly distributed within said chamber.

16. The device of claim 12, wherein said open end of said first and second wall form a 27 degree angle.

17. A flood barrier that attaches to a surface for protecting an area against flooding, comprising:
   a first wall and a second wall joined together at a first end, wherein said first and second wall and said ribs are constructed of a fiberglass fabric coated with a PTFE resin;
   wherein an outer side of said first and second walls further comprise a textile fabric comprising an aluminum foil laminated on one side of said PTFE resin using an adhesive;
   a sealing means on a leading edge of said second wall for securing said second wall to a surface to create a leak-proof barrier;
   a plurality of flexible ribs attached between said first wall and said second wall and further comprising one or more apertures and a rod that separates and open end of said first and second wall to a predefined angle to form a chamber with an open end;
   a plurality of insulating floats evenly spaced between said ribs on a bottom surface of said first wall;
   a terminal rib on either end of said barrier;
   a gap filler transitioning from said terminal rib to an exposed corner of said barrier, wherein said gap filler comprises a combination of a first layer of sealing tape, a layer of uncured silicone and a second layer of sealing tape adhered to the barrier; and
   a corrosive blanket installed between said surface and said barrier, wherein said blanket comprises a textile fabric comprising amorphous silica fibers woven into a flexible fabric with an aluminum foil.

18. The device of claim 17, wherein said outer side of said first wall further comprises a sealing tape over said ribs.

19. The device of claim 17, wherein said one or more apertures permit said liquid to be evenly distributed within said chamber.

20. The device of claim 17, wherein said open end of said first and second wall form a 27 degree angle.

\* \* \* \* \*